(12) United States Patent
Jiang et al.

(10) Patent No.: US 12,416,931 B2
(45) Date of Patent: Sep. 16, 2025

(54) AUTONOMOUS ENVIRONMENTAL PERCEPTION, PATH PLANNING AND DYNAMIC LANDING METHOD AND SYSTEM OF UNMANNED AERIAL VEHICLE

(71) Applicant: China Jiliang University, Hangzhou (CN)

(72) Inventors: Wensong Jiang, Hangzhou (CN); Zai Luo, Hangzhou (CN); Linzhen Shi, Hangzhou (CN); Jie Zhu, Hangzhou (CN); Li Yang, Hangzhou (CN); Minyue Li, Hangzhou (CN); Yaru Li, Hangzhou (CN); Dian Bian, Hangzhou (CN); Yaxiong He, Hangzhou (CN)

(73) Assignee: China Jiliang University, Hangzhou (CN)

( * ) Notice: Subject to any disclaimer, the term of this patent is extended or adjusted under 35 U.S.C. 154(b) by 0 days.

(21) Appl. No.: 19/017,245

(22) Filed: Jan. 10, 2025

(65) Prior Publication Data

US 2025/0147518 A1    May 8, 2025

(30) Foreign Application Priority Data

Aug. 22, 2024    (CN) .......................... 202411158190.X

(51) Int. Cl.
*G05D 1/644*    (2024.01)
*G05D 1/622*    (2024.01)
(Continued)

(52) U.S. Cl.
CPC ............ *G05D 1/644* (2024.01); *G05D 1/622* (2024.01); *G05D 1/654* (2024.01); *G05D 2101/15* (2024.01); *G05D 2109/20* (2024.01)

(58) Field of Classification Search
None
See application file for complete search history.

(56) References Cited

U.S. PATENT DOCUMENTS

2021/0349478 A1    11/2021   Bigdeli et al.
2022/0108621 A1*   4/2022    Li .......................... G05D 1/042
(Continued)

OTHER PUBLICATIONS

Faria et al., "Efficient Lazy Theta* Path Planning over a Sparse Grid to Explore Large 3D Volumes with a Multirotor UAV", Sensors 2019, 19, 174, Jan. 5, 2019, pp. 1-21 (Year: 2019).*
(Continued)

*Primary Examiner* — Tamara L Weber

(57) ABSTRACT

An autonomous environmental perception, path planning and dynamic landing method includes: obtaining three-dimensional environment information in real time; determining a global starting point and a global end point, and generating an initial path; optimizing the initial path based on a local path optimization algorithm to obtain a first optimized path; when a perception threshold of the current position of the unmanned aerial vehicle is greater than a preset threshold, optimizing the initial path based on a frontier-perceived path optimization method to obtain a second optimized path and a local end point; when the unmanned aerial vehicle advances to the local end point, switching to optimizing the initial path in real time based on the local path optimization algorithm; and when the unmanned aerial vehicle arrives at the global end point, carrying out dynamic landing based on a deep reinforcement learning algorithm.

4 Claims, 8 Drawing Sheets

(51) Int. Cl.
*G05D 1/654* (2024.01)
*G05D 101/15* (2024.01)
*G05D 109/20* (2024.01)

(56) References Cited

U.S. PATENT DOCUMENTS

2024/0062663 A1 2/2024 Bachrach et al.
2024/0168480 A1 5/2024 Varadarajan et al.

OTHER PUBLICATIONS

Jung et al., "Robust Collision-free Lightweight Aerial Autonomy for Unknown Area Exploration", Mar. 16, 2021, pp. 1-8 (Year: 2021).*
Zhong et al., "Information-Driven Fast Marching Autonomous Exploration With Aerial Robots", IEEE Robotics and Automation Letters, vol. 7, No. 2, Apr. 2022, pp. 810-817 (Year: 2022).*
Musil et al., "SphereMap: Dynamic Multi-Layer Graph Structure for Rapid Safety-Aware UAV Planning", IEEE Robotics and Automation Letters, vol. 7, No. 4, Oct. 2022, pp. 11007-11014 (Year: 2022).*
Hu et al., "UAV Real-time Path Planning Based on Heuristic Angle Search Strategy in an Unknown Environment", 2023 2nd International Symposium on Control Engineering and Robotics (ISCER), Feb. 1, 2023, pp. 216-222 (Year: 2023).*

* cited by examiner

AUTONOMOUS ENVIRONMENTAL PERCEPTION, PATH PLANNING AND DYNAMIC LANDING METHOD AND SYSTEM OF UNMANNED AERIAL VEHICLE

CROSS-REFERENCE TO RELATED APPLICATIONS

This application claims priority to Chinese Patent Application No. 202411158190.X with a filing date of Aug. 22, 2024. The content of the aforementioned application, including any intervening amendments thereto, is incorporated herein by reference.

TECHNICAL FIELD

The present disclosure relates to the technical field of unmanned aerial vehicles, and in particular to an autonomous environmental perception, path planning and dynamic landing method and system of an unmanned aerial vehicle.

BACKGROUND ART

In modern society, the rapid development of an unmanned aerial vehicle technology and the wide application thereof in various fields, such as military, agriculture, express delivery and disaster relief, have greatly promoted the development of social productivity. However, in unknown large scenarios (such as complex urban environments, unmapped natural terrain or post-disaster ruins), the autonomous environmental perception and path planning of the unmanned aerial vehicle face many challenges. Such challenges mainly include the accuracy and real time of environmental perception, and the efficiency and safety of path planning.

In the unknown large scenarios, if you want to get a global optimal path, you have to know the environmental information in advance, but it is unrealistic in actual applications. The existing path planning algorithms of the unmanned aerial vehicle are all designed as local planning methods for better application to the actual environment, targeting small obstacles in the environment. In such an environment, in order to ensure real-time operation, the unmanned aerial vehicle also perceives local information, which has limitations in space, with no memory of the perceived environment, and it is easy to continuously perform meaningless replanning at the same space, wasting resources. Most of the current existing unmanned aerial vehicle landing control methods are based on traditional control strategies, which require a lot of expert experience in design and debugging, and learning methods require multiple repetitive training and learning in a specific environment, so strict requirements are proposed on the specific environment.

Therefore, it is urgent to provide an autonomous environmental perception, path planning and dynamic landing method and system of an unmanned aerial vehicle. Different path planning methods could be selected for different conditions to avoid path redundancy or falling into a local optimal solution, thereby improving the path optimization efficiency and realizing accurate dynamic landing of the unmanned aerial vehicle.

SUMMARY OF THE INVENTION

In order to solve the above technical problems, the present disclosure provides an autonomous environmental perception, path planning and dynamic landing method and system of an unmanned aerial vehicle. Different path planning methods could be selected for different conditions to avoid path redundancy or falling into a local optimal solution, thereby improving the path optimization efficiency and realizing accurate dynamic landing of the unmanned aerial vehicle.

The present disclosure provides an autonomous environment perception, path planning and dynamic landing method of an unmanned aerial vehicle, which includes the following steps:

S1. obtaining depth information and two-dimensional plane information of an environment in real time by the unmanned aerial vehicle, and generating three-dimensional environmental information in space through a three-dimensional reconstruction algorithm based on the depth information and the two-dimensional plane information;

S2. determining a global starting point and a global end point, and generating an initial path according to the global starting point and the global end point;

S3. optimizing the initial path in real time based on a local path optimization algorithm to obtain a first optimized path, and meanwhile, judging in real time whether a perception threshold of the current position of the unmanned aerial vehicle is greater than a preset threshold; if the perception threshold is greater than the preset threshold, proceeding into S4; otherwise, continuing to perform S3, until the global end point is reached, and proceeding into S7;

S4. perceiving the frontier of the field of view of the unmanned aerial vehicle, storing the perceived frontier in the form of space points and recording as frontier points, and performing distance optimization on the frontier points to obtain a frontier space point set P;

S5. according to the frontier space point set P, optimizing the initial path in real time based on a frontier-perceived path optimization method to obtain a second optimized path and a local end point;

S6. switching to optimizing the initial path in real time based on the local path optimization algorithm when the unmanned aerial vehicle advances along the second optimized path to the local end point;

S7. carrying out dynamic landing based on a deep reinforcement learning algorithm after the unmanned aerial vehicle arrives at the global end point.

Further, in S3, the initial path is optimized in real time based on the local path optimization algorithm to obtain the first optimized path, and meanwhile, it is judged in real time whether the perception threshold is greater than the preset threshold, wherein the calculation formula of the perception threshold is as follows:

$$\tau_{per} = \frac{\Gamma_{optimized}}{\Gamma_{init}};$$

wherein $\tau_{per}$ represents the perception threshold, $\Gamma_{init}$ represents the initial path within the field of view of the unmanned aerial vehicle, $\Gamma_{optimized}$ represents the first optimized path within the field of view of the unmanned aerial vehicle, and t represents the preset threshold, when $\tau_{per} > \tau$, proceeding into S4.

Further, in S4, performing distance optimization on the frontier points to obtain a frontier space point set P includes:
constructing a cube area with a side length of 2 m with the frontier point as a central point, dividing the cube area into 8 sub-cube areas with a side length of m, and taking vertices of the sub-cube areas as collision judgment points to judge whether the distance between each collision judgment point and a target obstacle is less than a preset collision distance; and if the distance between at least one collision judgment point and the target obstacle is less than the present collision distance, deleting the frontier point;

traversing all frontier points by repeating the above steps, and constructing the frontier space point set P according to the frontier points finally retained.

Further, in S5, according to the frontier space point set P, optimizing the initial path in real time based on a frontier-perceived path optimization method to obtain a second optimized path and a local end point includes:

S51. determining the local end point;

According to the view distance of the unmanned aerial vehicle, selecting the point on the initial path that is farthest from the current position of the unmanned aerial vehicle as the initial local end point; and if the initial local end point is within the obstacle range, selecting the second local end point by doubling the view distance of the unmanned aerial vehicle based on the initial local end point until the selected local end point is outside the obstacle range;

S52. determining decision indicators, and calculating a decision function according to the decision indicators; wherein the decision indicators include: adjacent point constraint, distance constraint, and direction constraint;

The expressions of the adjacent point constraint are as follows:

$$d_A(p_i) = \|p_c - p_i\|;$$

$$f_A(i) = \begin{cases} (d_A(p_i) - d_{min})/(d_{max} - d_{min}) & d_{min} < d(i) < d_{max} \\ 1 & \text{others} \end{cases};$$

wherein $d_A$ represents the distance between adjacent points, $f_A$ represents a cost function of the adjacent points, $p_i$ represents the i-th frontier point in the frontier space point set P, $p_c$ represents the current position of the unmanned aerial vehicle, $\|\cdot\|$ represents the Euclidean distance operation, $d_{min}$ represents the minimum value of the selected point range within the field of view of the unmanned aerial vehicle, and $d_{max}$ represents the maximum value of the selected point range within the field of view of the unmanned aerial vehicle;

The expressions of the distance constraint are as follows:

$$d_L(p_i) = \|p_g - p_i\|;$$

$$f_L(i) = d_L(p_i)/(d_{Lmax} - d_{Lmin});$$

wherein $d_L$ represents the distance between the current position $p_c$ of the unmanned aerial vehicle and the local end point $p_g$, $f_L$ represents a distance cost function, $p_g$ represents the local end point, $d_{Lmin}$ represents the minimum value of the distance from all frontier points in the frontier space point set P to the local end point $p_g$, and $d_{Lmax}$ represents the maximum value of the distance from all frontier points in the frontier space point set P to the local end point $p_g$;

The expressions of the direction constraint are as follows:

$$d_D(p_i) = \frac{p_i - p_c}{\|p_i - p_c\|} \cdot \frac{v_c}{\|v_c\|} + 1;$$

$$f_D(i) = (d_D(p_i) - d_{Dmin})/(d_{Dmax} - d_{Dmin});$$

wherein $d_D$ represents a specific value of the deviation from a current speed direction, $f_D$ represents a direction cost function, $v_c$ represents a current speed of the unmanned aerial vehicle, $d_{Dmin}$ represents the minimum value of the deviation from the current speed direction, and $d_{Dmax}$ represents the maximum value of the deviation from the current speed direction;

The calculation formula of the decision function is as follows:

$$p_b = \underset{p_i \in P}{\arg\min}\, \lambda_A f_A(p_i) + \lambda_L f_L(p_i) + \lambda_D f_D(p_i);$$

wherein $\lambda_A$, $\lambda_L$ and $\lambda_D$ represent the weight of the adjacent point constraint, the weight of the distance constraint, and the weight of the direction constraint respectively, and $p_b$ represents an optimal replanning point;

S53. generating the second optimized path according to the current position $p_c$ of the unmanned aerial vehicle and the optimal replanning point $p_b$.

Further, in S6, switching to optimizing the initial path in real time based on the local path optimization algorithm when the unmanned aerial vehicle advances along the second optimized path to the local end point includes:

S61. When the unmanned aerial vehicle advances along the second optimized path, each time a preset time threshold or a preset distance threshold is passed, reperforming S5 and updating the optimal replanning point $p_b$ and the second optimized path;

S62. recording a path length $L_{thresh}$ that the unmanned aerial vehicle flies along the second optimized path from the current position, and when the path length $L_{thresh}$ is greater than a preset path length, reselecting the local end point $p_g$, reperforming S5 according to the new local end point, and updating the optimal replanning point $p_b$ and the second optimized path; wherein the local end point $p_g$ is reselected, specifically as follows: selecting a new local end point by doubling the view distance of the unmanned aerial vehicle based on the current local end point;

S63. switching to optimizing the initial path in real time based on the local path optimization algorithm when the unmanned aerial vehicle arrives at the local end point $p_g$.

Further, optimizing the initial path in real time based on the local path optimization algorithm to obtain the first optimized path, or optimizing the initial path in real time based on the frontier-perceived path optimization method to obtain the second optimized path further includes:

inserting a middle point according to the current position of the unmanned aerial vehicle and the local end point, and generating the first optimized path or the second optimized path; wherein a calculation formula of the middle point is as follows:

$$p_m = \frac{p_c + p_g}{2} + \frac{v_c^3}{2 \cdot a_{max} \cdot \left\| v_c \cdot \frac{v_c \times (p_g - p_c)}{\|v_c\| \cdot \|p_g - p_c\|} \right\|} \left( \frac{v_c \times (p_g - p_c)}{\|v_c\| \cdot \|p_g - p_c\|} \right)^3;$$

wherein $p_m$ represents the middle point, and $a_{max}$ represents the maximum angular velocity of the unmanned aerial vehicle.

Further, in S7, carrying out dynamic landing based on a deep reinforcement learning algorithm after the unmanned aerial vehicle arrives at the global end point includes:

S71. constructing a landing control agent based on a deep deterministic policy gradient algorithm;

S72. obtaining observation values of the unmanned aerial vehicle and the landing platform;

S73. defining a reward function; wherein the reward function includes a horizontal direction reward function and a vertical direction reward function;

S74. judging whether the unmanned aerial vehicle meets landing conditions according to the observation values of the unmanned aerial vehicle and the landing platform and the reward function; and S75. controlling the unmanned aerial vehicle by a landing control agent according to the observation values of the unmanned aerial vehicle and the landing platform, the reward function, and whether the unmanned aerial vehicle meets the landing conditions until the unmanned aerial vehicle completes the dynamic landing.

The present disclosure further provides an autonomous environment perception, path planning and dynamic landing system of an unmanned aerial vehicle, which is configured to perform any of the above autonomous environment perception, path planning and dynamic landing method of the unmanned aerial vehicle. The system includes the following modules:

a data acquisition module, configured to acquire depth information and two-dimensional plane information of an environment in real time by the unmanned aerial vehicle, and generate three-dimensional environmental information in space through a three-dimensional reconstruction algorithm based on the depth information and the two-dimensional plane information;

an initial path generation module, connected to the data acquisition module and configured to determine a global starting point and a global end point, and generate an initial path according to the global starting point and the global end point;

an optimized path generation module, connected with the data acquisition module and the initial path generation module, and configured to optimize the initial path in real time based on the local path optimization algorithm to obtain the first optimized path, and meanwhile, judge in real time whether the perception threshold of the current position of the unmanned aerial vehicle is greater than a preset threshold; if the perception threshold is greater than the preset threshold, perceive the frontier of the field of view of the unmanned aerial vehicle, store the perceived frontier in the form of space points and record as frontier points, and perform distance optimization on the frontier points to obtain a frontier space point set P; according to the frontier space point set P, optimize the initial path in real time based on a frontier-perceived path optimization method to obtain a second optimized path and a local end point; judge the distance between the current position of the unmanned aerial vehicle and the local end point in real time when the unmanned aerial vehicle advances along the second optimized path, and switch to optimizing the initial path in real time based on the local path optimization algorithm when the distance is less than the preset distance; otherwise, continue to optimize the initial path in real time based on the local path optimization algorithm until the global end point is reached; and a dynamic landing module, connected to the optimized path generation module and configured to carry out dynamic landing based on a deep reinforcement learning algorithm after the unmanned aerial vehicle arrives at the global end point.

The embodiment of the present disclosure has the following technical effects:

The present disclosure judges whether the current path optimization strategy of the unmanned aerial vehicle is based on the local path optimization algorithm or the frontier-perceived path optimization method by calculating the size of the perception threshold and the preset threshold. Different path planning methods could be selected for different conditions to avoid path redundancy or falling into a local optimal solution, thereby improving the path optimization efficiency. By designing the reward functions for the horizontal and vertical directions, the deep reinforcement learning algorithm is used to control the landing of the unmanned aerial vehicle, thereby increasing the update efficiency of the neural network, improving the problems of small sample space and slow data processing, and realizing accurate dynamic landing of the unmanned aerial vehicle;

In addition, by inserting the middle point during path optimization, it is possible to avoid the optimization trajectory from deviating too much to cause no solution to the optimization.

BRIEF DESCRIPTION OF THE DRAWINGS

To more clearly describe the technical solutions in the embodiment of the present disclosure or in the prior art, the drawings required to be used in the description of the embodiment or the prior art will be simply presented below. Apparently, the drawings in the following description are merely the embodiment of the present disclosure, and for those ordinary skilled in the art, other drawings can also be obtained according to the drawings without contributing creative labor.

DETAILED DESCRIPTION OF PREFERRED EMBODIMENTS

In order to make the purpose, technical solution and advantages of the present disclosure clearer, clear and complete description is made below to the technical solution of the present disclosure. Apparently, the embodiment described is only a part of embodiment of the present disclosure, rather than all embodiments. Based on the embodiment in the present disclosure, all other embodiments obtained by those ordinary skilled in the art without contributing creative labor will belong to the protection scope of the present disclosure.

Figure 1:
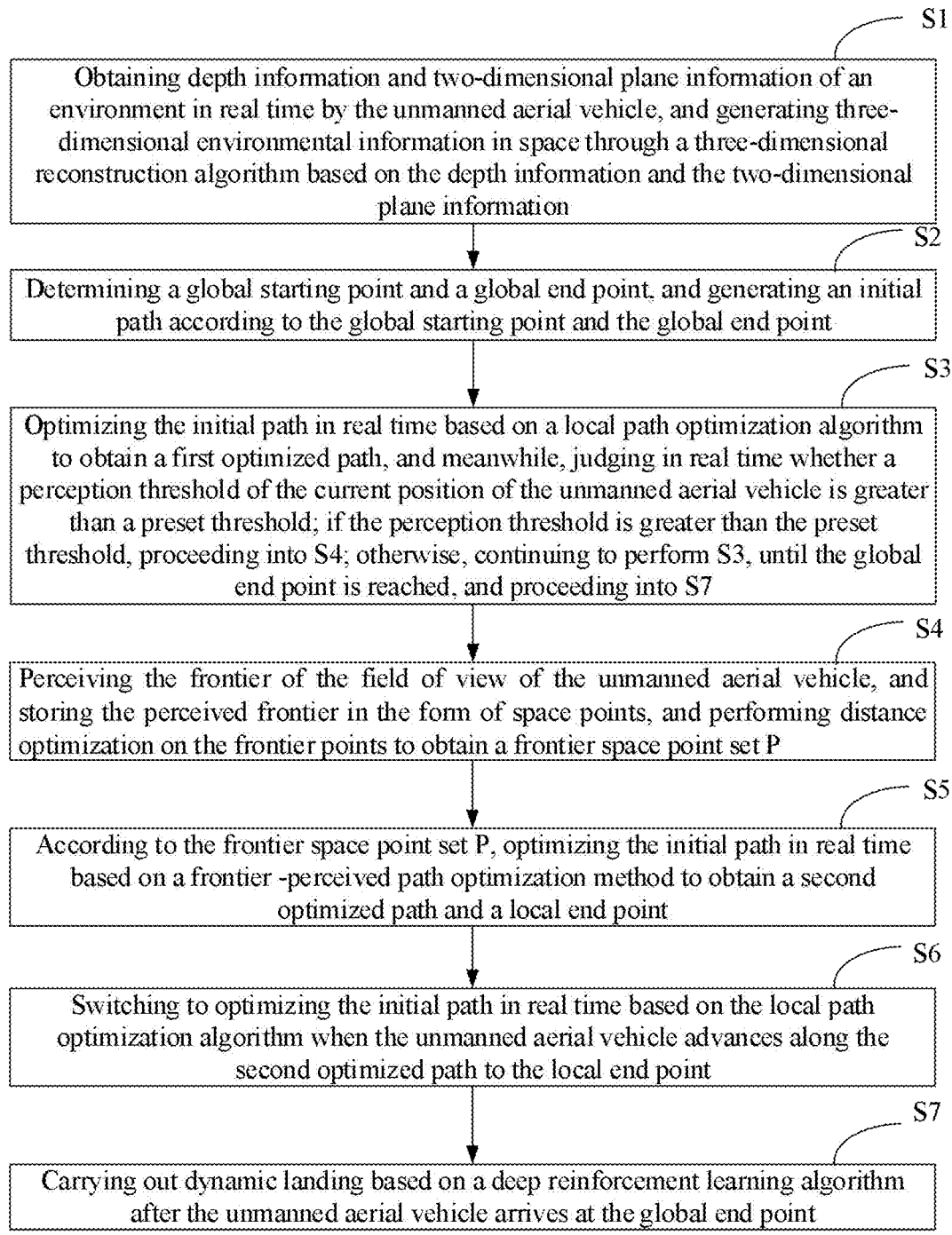
FIG. 1 is a flow chart illustrating an autonomous environment perception, path planning and dynamic landing method of an unmanned aerial vehicle according to an embodiment of the present disclosure.
Figure 2:
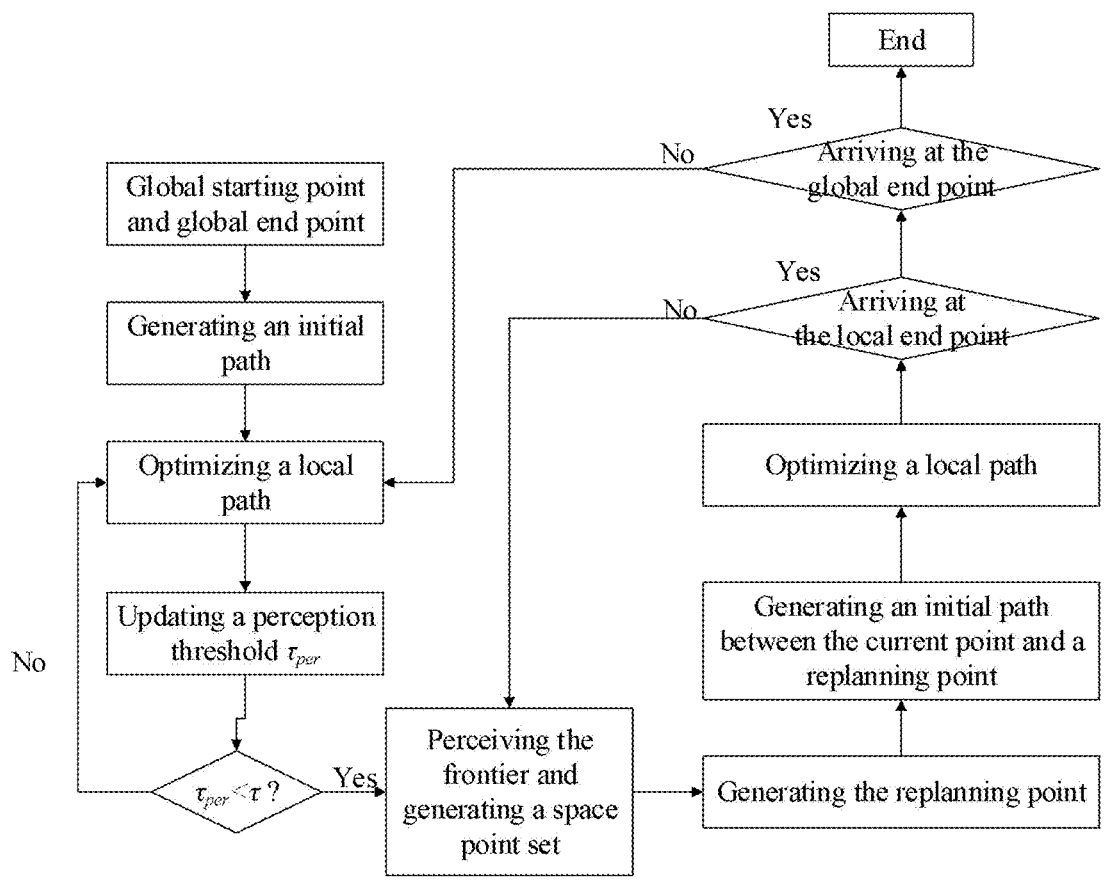
FIG. 2 is a logic diagram of an autonomous environment perception, path planning and dynamic landing method of an unmanned aerial vehicle according to an embodiment of the present disclosure.

The present disclosure proposes an autonomous environment perception, path planning and dynamic landing method of an unmanned aerial vehicle. FIG. 1 is a flow chart illustrating an autonomous environment perception, path planning and dynamic landing method of an unmanned aerial vehicle provided by an embodiment of the present disclosure. FIG. 2 is a logic diagram of an autonomous environment perception, path planning and dynamic landing method of an unmanned aerial vehicle provided by an embodiment of the present disclosure. Referring to FIG. 1 and FIG. 2, the method specifically includes:

S1. obtaining depth information and two-dimensional plane information of an environment in real time by the unmanned aerial vehicle, and generating three-dimensional environmental information in space through a three-dimensional reconstruction algorithm based on the depth information and the two-dimensional plane information.

Specifically, the unmanned aerial vehicle obtains the depth information and the two-dimensional plane information of the environment in real time through a binocular depth camera, generates the three-dimensional environment in space through the three-dimensional reconstruction algorithm, and performs obstacle avoidance path planning based on the three-dimensional environment.

S2. determining a global starting point and a global end point, and generating an initial path according to the global starting point and the global end point.

Specifically, since the current scenario is unknown, the global start point and the global end point are set arbitrarily, that is, the method is applicable to various unknown scenarios and has strong adaptability to any unknown scenario.

S3. optimizing the initial path in real time based on the local path optimization algorithm to obtain the first optimized path, and meanwhile, judging in real time whether the perception threshold of the current position of the unmanned aerial vehicle is greater than a preset threshold.

Figure 3:
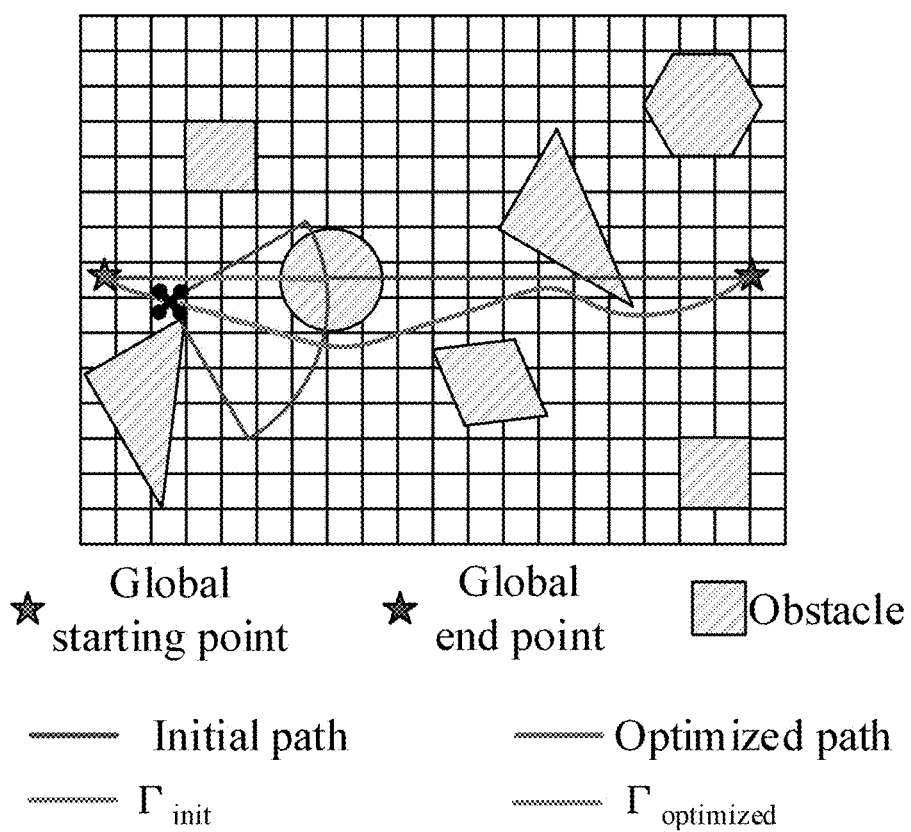
FIG. 3 is a schematic diagram of a perception threshold less than or equal to a preset threshold according to an embodiment of the present disclosure.
Figure 4:
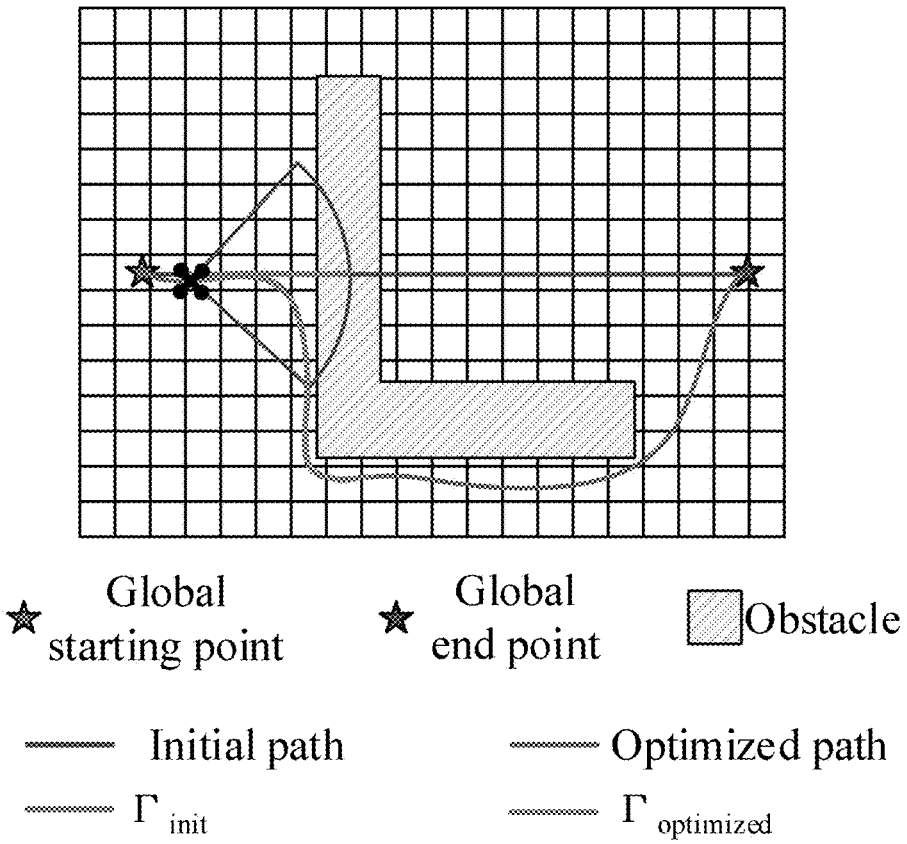
FIG. 4 is a schematic diagram of a perception threshold greater than a preset threshold according to an embodiment of the present disclosure.

Specifically, FIG. 3 is a schematic diagram of a perception threshold less than or equal to a preset threshold provided by an embodiment of the present disclosure. FIG. 4 is a schematic diagram of a perception threshold greater than a preset threshold provided by an embodiment of the present disclosure. Referring to FIG. 3 and FIG. 4, the calculation formula of the perception threshold is as follows:

$$\tau_{per} = \frac{\Gamma_{optimized}}{\Gamma_{init}};$$

wherein $\tau_{per}$ represents the perception threshold, $\Gamma_{init}$ represents the initial path within the field of view of the unmanned aerial vehicle, $\Gamma_{optimized}$ represents the first optimized path within the field of view of the unmanned aerial vehicle, and t represents the preset threshold. If the perception threshold is greater than the preset threshold, that is, when $\tau_{per} > \tau$, proceeding into S4, otherwise, S3 continues to be performed until the global end point is reached, and then proceeding into S7.

Specifically, the first optimized path is a collision-free path obtained based on the initial path through the local path optimization algorithm. The initial path is a straight path from the global starting point to the global end point (it may pass through obstacles). Therefore, the length of the first optimized path must be greater than or equal to the length of the initial path. Then, when the volume of the obstacle becomes larger, the optimized path would also become longer, in order to complete the obstacle avoidance task. Therefore, when $\tau_{per} > \tau$, it means that a larger obstacle has been encountered. In order to avoid path redundancy or falling into a local optimal solution, it is switched to the frontier-perceived path optimization method.

S4. perceiving the frontier of the field of view of the unmanned aerial vehicle, storing the perceived frontier in the form of space points and recording as frontier points, and performing distance optimization on the frontier points to obtain a frontier space point set P.

Figure 5:
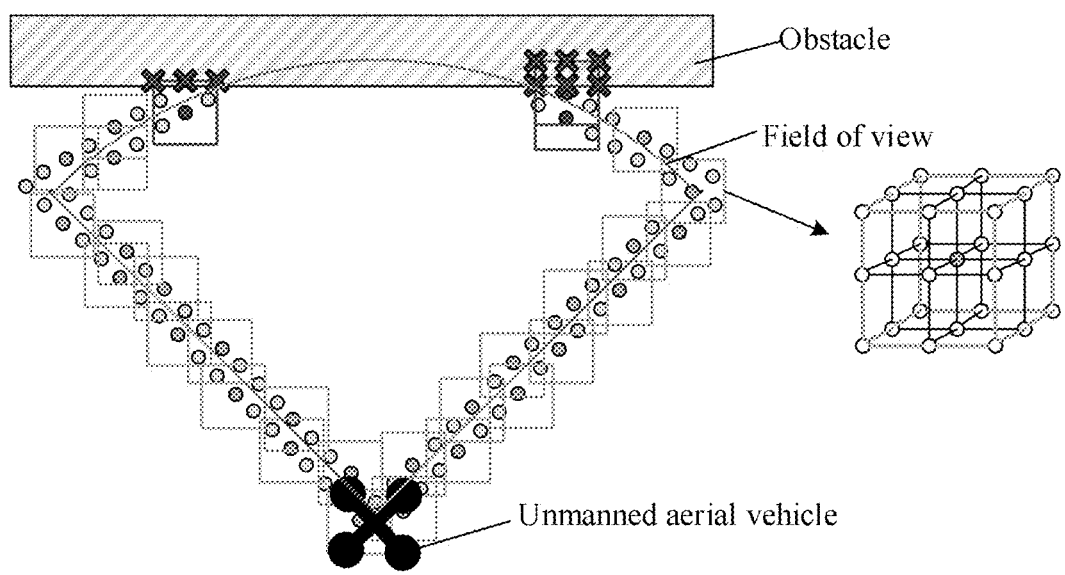
FIG. 5 is a schematic diagram of obtaining a frontier space point set by perceiving the frontier of the field of view of an unmanned aerial vehicle according to an embodiment of the present disclosure.

Specifically, FIG. 5 is a schematic diagram of obtaining a frontier space point set by perceiving the frontier of the field of view of an unmanned aerial vehicle according to an embodiment of the present disclosure. Referring to FIG. 5, the frontier of the field of view of an unmanned aerial vehicle is perceived. An area within the field of view of the unmanned aerial vehicle is a known area, an area outside the field of view of the unmanned aerial vehicle is an unknown area, and the junction between the known area and the unknown area is the frontier. The perceived frontier is stored in the form of space points and recorded as the frontier points. A cube area with a side length of 2 m is constructed with the frontier point as the central point and divided into 8 sub-cube areas with a side length of m. Vertices of the sub-cube areas are taken as collision judgment points, with 26 collision judgment points around a frontier point, to judge whether the distance between each collision judgment point and a target obstacle is less than a preset collision distance. If the distance between at least one collision judgment point and the target obstacle is less than the present collision distance, it indicates that collision with the obstacles may occur when the unmanned aerial vehicle arrives at the position of the frontier point, therefore, the frontier point is deleted. All frontier points are traversed by repeating the above steps, and the frontier space point set P is constructed according to the frontier points finally retained. Wherein the green points in FIG. 5 are the frontier points that constitute the frontier space point set P, and the red points are the frontier points that may collide with obstacles and therefore need to be deleted.

S5. according to the frontier space point set P, optimizing the initial path in real time based on a frontier-perceived path optimization method to obtain a second optimized path and a local end point.

S51. determining the local end point.

Specifically, according to the view distance of the unmanned aerial vehicle, the point on the initial path that is farthest from the current position of the unmanned aerial vehicle is selected as the initial local end point. If the initial local end point is within the obstacle range, the second local end point is selected by doubling the view distance of the unmanned aerial vehicle based on the initial local end point until the selected local end point is outside the obstacle range. It should be noted that the selected local end points are all on the initial path.

S52. determining decision indicators, and calculating a decision function according to the decision indicators.

The decision indicators include: adjacent point constraint, distance constraint, and direction constraint.

Specifically, the expressions of the adjacent point constraint are as follows:

$$d_A(p_i) = \|p_c - p_i\|;$$

$$f_A(i) = \begin{cases} (d_A(p_i) - d_{min})/(d_{max} - d_{min}) & d_{min} < d(i) < d_{max} \\ 1 & \text{others} \end{cases};$$

wherein $d_A$ represents the distance between adjacent points, $f_A$ represents a cost function of the adjacent points, $p_i$ represents the i-th frontier point in the frontier space point set P, $p_c$ represents the current position of the unmanned aerial vehicle, $\|\cdot\|$ represents the Euclidean distance operation, $d_{min}$ represents the minimum value of the selected point range within the field of view of the unmanned aerial vehicle, and $d_{max}$ represents the maximum value of the selected point range within the field of view of the unmanned aerial vehicle.

The expressions of the distance constraint are as follows:

$$d_L(p_i) = \|p_g - p_i\|;$$

$$f_L(i) = d_L(p_i)/(d_{Lmax} - d_{Lmin});$$

wherein $d_L$ represents the distance between the current position $p_c$ of the unmanned aerial vehicle and the local end point $p_g$, $f_L$ represents a distance cost function, $p_g$ represents the local end point, $d_{Lmin}$ represents the minimum value of the distance from all frontier points in the frontier space point set P to the local end point $p_g$, and $d_{Lmax}$ represents the maximum value of the distance from all frontier points in the frontier space point set P to the local end point $p_g$.

The expressions of the direction constraint are as follows:

$$d_D(p_i) = \frac{p_i - p_c}{\|p_i - p_c\|} \cdot \frac{v_c}{\|v_c\|} + 1;$$

$$f_D(i) = (d_D(p_i) - d_{Dmin})/(d_{Dmax} - d_{Dmin});$$

wherein $d_D$ represents a specific value of the deviation from a current speed direction, $f_D$ represents a direction cost function, $v_c$ represents a current speed of the unmanned aerial vehicle, $d_{Dmin}$ represents the minimum value of the deviation from the current speed direction, and $d_{Dmax}$ represents the maximum value of the deviation from the current speed direction.

The calculation formula of the decision function is as follows:

$$p_b = \underset{p_i \in P}{\operatorname{argmin}} \lambda_A f_A(p_i) + \lambda_L f_L(p_i) + \lambda_D f_D(p_i);$$

wherein $\lambda_A$, $\lambda_L$ and $\lambda_D$ represent the weight of the adjacent point constraint, the weight of the distance constraint, and the weight of the direction constraint respectively, and $p_b$ represents an optimal replanning point.

The optimal replanning point $p_b$ could be selected by minimizing the decision function.

S53. generating the second optimized path according to the current position $p_c$ of the unmanned aerial vehicle and the optimal replanning point $p_b$.

Further, when the path between the current position $p_c$ of the unmanned aerial vehicle and the replanning point $p_b$ is generated, since the replanning point $p_b$ is constantly changing in the generation process, it is possible that the distance between the two replanning points $p_b$ that appear one after the other is large, resulting in no solution to the optimized path. Therefore, in the process of optimizing the initial path to the optimized path, it is necessary to add a middle point between the current position $p_c$ of the unmanned aerial vehicle and the replanning point $p_b$, so that the final optimized trajectory would not deviate too much to cause no solution to the optimization.

Further, when the initial path is optimized in real time based on the local path optimization algorithm to obtain the first optimized path, a local end point is also provided. The local end point in the local path optimization algorithm is the point farthest from the current position of the unmanned aerial vehicle within the field of view of the unmanned aerial vehicle.

Therefore, optimizing the initial path in real time based on the local path optimization algorithm to obtain the first optimized path, or optimizing the initial path in real time based on the frontier-perceived path optimization method to obtain the second optimized path further includes:

inserting a middle point according to the current position of the unmanned aerial vehicle and the local end point, and generating the first optimized path or the second optimized path;

The calculation formula of the middle point is as follows:

$$p_m = \frac{p_c + p_g}{2} + \frac{v_c^3}{2 \cdot a_{max} \cdot \left\|v_c \cdot \frac{v_c \times (p_g - p_c)}{\|v_c\| \cdot \|p_g - p_c\|}\right\|} (\frac{v_c \times (p_g - p_c)}{\|v_c\| \cdot \|p_g - p_c\|})^3;$$

wherein $p_m$ represents the middle point, and $a_{max}$ represents the maximum angular velocity of the unmanned aerial vehicle.

S6. switching to optimizing the initial path in real time based on the local path optimization algorithm when the unmanned aerial vehicle advances along the second optimized path to the local end point.

S61. When the unmanned aerial vehicle advances along the second optimized path, each time a preset time threshold or a preset distance threshold is passed, reperforming S5 and updating the optimal replanning point $p_b$ and the second optimized path.

Exemplarily, the preset time threshold may be set to 0.5 s, and the preset distance threshold may be set to 1 m. That is, when the unmanned aerial vehicle advances along the second optimized path, the optimal replanning point $p_b$ and the second optimized path are updated every time the running time exceeds 0.5 s or the running distance exceeds 1 m.

S62. recording a path length $L_{thresh}$ that the unmanned aerial vehicle flies along the second optimized path from the current position, and when the path length $L_{thresh}$ is greater than a preset path length, reselecting the local end point $p_g$, reperforming S5 according to the new local end point, and updating the optimal replanning point $p_b$ and the second optimized path.

The step of reselecting the local end point $p_g$ specifically includes: a new local end point is selected by doubling the view distance of the unmanned aerial vehicle based on the current local end point.

Exemplarily, the preset path length may be set to 5 times the field of view of the unmanned aerial vehicle. When the path length $L_{thresh}$ that the unmanned aerial vehicle flies is greater than 5 times the field of view of the unmanned aerial vehicle and the local end point is not reached, it indicates that the currently selected local end point is inappropriate, which may cause the path deviation, therefore, the local end point needs to be reselected.

S63. switching to optimizing the initial path in real time based on the local path optimization algorithm when the unmanned aerial vehicle arrives at the local end point $p_g$.

Specifically, when the unmanned aerial vehicle arrives at the local end point $p_g$, it indicates that the unmanned aerial vehicle has bypassed a larger obstacle. At this time, the path optimization efficiency could be further improved by switching to optimizing the initial path in real time based on the local path optimization algorithm.

S7. carrying out dynamic landing based on a deep reinforcement learning algorithm after the unmanned aerial vehicle arrives at the global end point.

Figure 6:
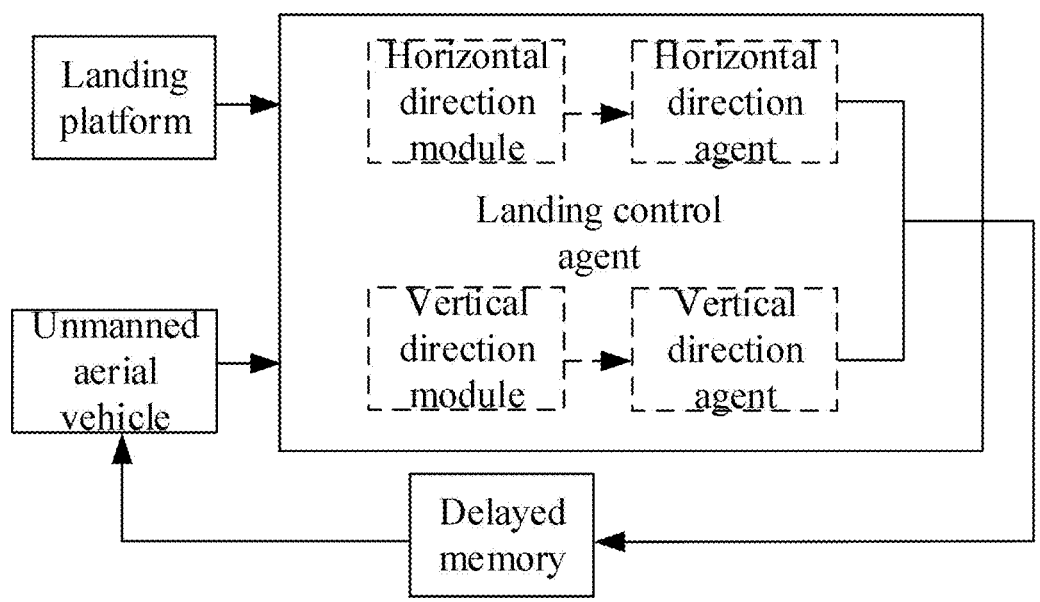
FIG. 6 is a logic diagram of dynamic landing based on a deep reinforcement learning algorithm according to an embodiment of the present disclosure.

Specifically, FIG. 6 is a logic diagram of dynamic landing based on a deep reinforcement learning algorithm provided by an embodiment of the present disclosure. Referring to FIG. 6, when the unmanned aerial vehicle arrives at the global end point and completes the task, the unmanned aerial vehicle needs to land on the ground or on a mobile carrier. At this time, a dynamic landing function is needed.

S71. constructing a landing control agent based on a deep deterministic policy gradient algorithm.

Specifically, firstly, based on the theory of stochastic processes, the landing control problem of the unmanned aerial vehicle is transformed into a Markov decision process. Secondly, the reward function that respectively considers the control processes of the unmanned aerial vehicle in the horizontal and vertical directions is designed, and the landing control problem is transferred to a reinforcement learning framework. Then, the deep deterministic policy gradient (DDPG) algorithm is used to solve the reinforcement learning problem, and the landing control agent is obtained through a large amount of training. The DDPG algorithm, which is a method that combines neural networks and Q-learning, integrates the function approximation and representation capabilities of deep learning (DL) into reinforcement learning (RL). The algorithm is very similar to Q-learning. On the basis of Q-learning, a target Q value network is added, and an experience replay mechanism is adopted.

The landing control agent includes a horizontal direction module, a horizontal direction agent, a vertical direction module, and a vertical direction agent. The horizontal direction module and the vertical direction module are used to calculate the reward function based on the observation values of the unmanned aerial vehicle and the landing platform, and whether the unmanned aerial vehicle meets the landing conditions; the horizontal direction agent and the vertical direction agent are used to control the unmanned aerial vehicle based on the observation values of the unmanned aerial vehicle and the landing platform, the reward function, and whether the unmanned aerial vehicle meets the landing conditions.

The delayed memory in FIG. 5 represents the state of the unmanned aerial vehicle at the last moment (i.e., the state after the unmanned aerial vehicle is controlled by the landing control agent at the last moment), and the current observation value of the unmanned aerial vehicle is determined based on the state of the unmanned aerial vehicle at the last moment.

S72. obtaining observation values of the unmanned aerial vehicle and the landing platform.

Specifically, the observation values of the unmanned aerial vehicle and the landing platform are obtained, including: the position of the unmanned aerial vehicle, the position of the landing platform, the speed of the unmanned aerial vehicle, and the flight action of the unmanned aerial vehicle; wherein the landing platform may include a fixed platform and a trolley.

S73. defining a reward function.

The reward function includes a horizontal direction reward function and a vertical direction reward function.

Figure 7:
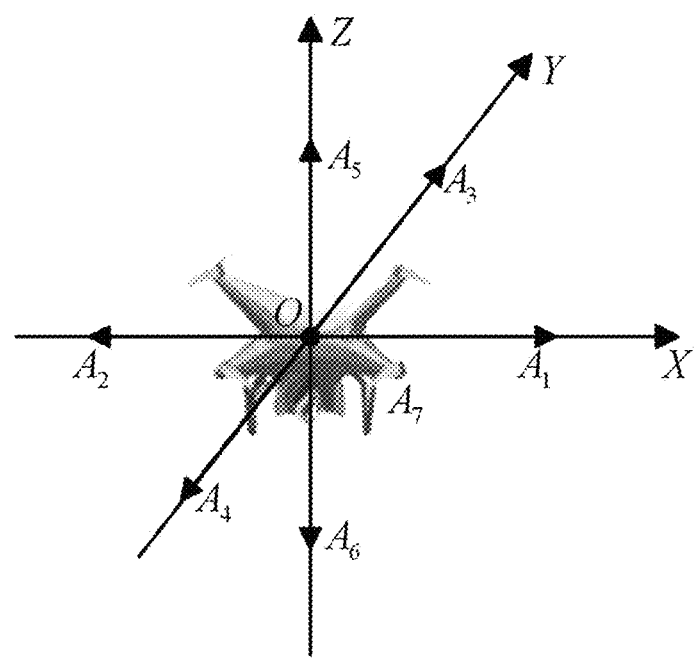
FIG. 7 is a schematic diagram of flight actions of an unmanned aerial vehicle in space according to an embodiment of the present disclosure.

Further, FIG. 7 is a schematic diagram of flight actions of an unmanned aerial vehicle in space provided by an embodiment of the present disclosure. Referring to FIG. 7, the flight actions that can be selected by the unmanned aerial vehicle in space include seven movements: forward movement $A_1$, backward movement $A_2$, leftward movement $A_3$, rightward movement $A_4$, upward movement $A_5$, downward movement $A_6$, and hovering $A_7$. In a ground coordinate system, the forward movement means a movement along a positive direction of an X axis, and the backward movement is the opposite; the leftward movement means a movement along a positive direction of a Y axis, and the rightward movement is the opposite; the upward movement means a movement along a positive direction of a Z axis, and the downward movement is the opposite; and hovering means that the unmanned aerial vehicle is stationary in the air.

Specifically, the horizontal direction reward function $r_{level}$ includes a positive reward $r_{l1}$ for the unmanned aerial vehicle to reach the landing condition in the horizontal direction, a flight action reward $r_{l2}$, and a reward shaping $r_{l3}$;

Exemplarily, the expression of the positive reward $r_{l1}$ for the unmanned aerial vehicle to reach the landing condition in the horizontal direction is as follows:

$$r_{l1} = \begin{cases} 0, \Delta d_{xy} > 1 \cap \Delta v_{xy} > 0.4 \\ 1, \Delta d_{xy} \leq 1 \cap \Delta v_{xy} > 0.4 ; \\ 2, \Delta d_{xy} \leq 1 \cap \Delta v_{xy} \leq 0.4 \end{cases}$$

wherein $\Delta d_{xy}$ represents a horizontal distance error between the unmanned aerial vehicle and the landing platform, and $\Delta v_{xy}$ represents a horizontal relative speed between the unmanned aerial vehicle and the landing platform. The above formula indicates: first judging whether the horizontal distance error between the unmanned aerial vehicle and the landing platform is within 1 m, and if satisfied, the reward is +1; and then judging whether the horizontal relative speed between the unmanned aerial vehicle and the landing platform is within 0.4 m/s, and if satisfied, the reward is +1 again, otherwise no reward is given; wherein the threshold of the horizontal distance error and the threshold of the horizontal relative speed could be set according to the actual situation, and are not limited to 1 m and 0.4 m/s mentioned in the embodiment.

The expression of the flight action reward $r_{l2}$ is as follows:

$$r_{l2} = \begin{cases} \cos\theta - 0.25\Delta v_{xy}, & a_t = A_1 \\ -\cos\theta - 0.25\Delta v_{xy}, & a_t = A_2 \\ \sin\theta - 0.25\Delta v_{xy}, & a_t = A_3 \\ -\sin\theta - 0.25\Delta v_{xy}, & a_t = A_4 \end{cases};$$

wherein θ represents an angle between the projection of the unmanned aerial vehicle on the horizontal plane XOY and the X axis, and $a_t$ represents the flight action of the unmanned aerial vehicle. The above formula indicates: if the unmanned aerial vehicle moves close to the landing platform, a positive reward is given, otherwise a negative reward is given.

The expression of the reward shaping $r_{l3}$ is as follows:

$$r_{l3} = \begin{cases} 10, & \Delta d_{xy} \leq 0.5 \cap z_{q,t} \leq 0.2 \\ 0, & \Delta d_{xy} > 0.5 \cup z_{q,t} > 0.2 \end{cases};$$

wherein $z_{q,t}$ represents a vertical distance of the unmanned aerial vehicle on the horizontal plane XOY. The above formula indicates: first judging whether the horizontal distance error between the unmanned aerial vehicle and the landing platform is within 0.5 m, and then judging whether the height of the unmanned aerial vehicle is within 0.2 m. If satisfied, a reward is given, otherwise no reward is given; wherein the threshold of the horizontal distance error and the height threshold of the unmanned aerial vehicle could be set according to the actual situation, and are not limited to 0.5 m and 0.2 m mentioned in the embodiment.

The expression of the horizontal direction reward function $r_{level}$ is as follows:

$$r_{level} = r_{l1} + r_{l2} + r_{l3}.$$

Specifically, the vertical direction reward function $r_{vertical}$ includes a comprehensive discrimination reward $r_{v1}$ of an unmanned aerial vehicle height and an action command, and a hovering action reward $r_{v2}$;

Exemplarily, the expression of the comprehensive discrimination reward $r_{v1}$ of the unmanned aerial vehicle height and the action command is as follows:

$$r_{v1} = \begin{cases} 1, & z_{q,t} > 0 \cap a_t = A_6 \\ -1, & z_{q,t} > 0 \cap a_t = A_5 \end{cases};$$

wherein the above formula indicates: first judging whether the height of the unmanned aerial vehicle is greater than 0 m, and then judging whether the unmanned aerial vehicle is descending. If satisfied, a positive reward is given, otherwise a negative reward is given.

The expression of the hovering action reward $r_{v2}$ is as follows:

$$r_{v2} = \begin{cases} 0, & z_{q,t} < 0.2 \cup a_t \neq A_7 \\ -1, & z_{q,t} \geq 0.2 \cap a_t = A_7 \end{cases};$$

wherein the above formula indicates: if the height of the unmanned aerial vehicle is less than 0.2 m or the unmanned aerial vehicle is not in a hovering state, no reward is given; if the height of the unmanned aerial vehicle is greater than or equal to 0.2 m and the unmanned aerial vehicle is in the hovering state, a negative reward is given; wherein the height threshold of the unmanned aerial vehicle could be set according to actual conditions and is not limited to 0.2 m mentioned in the embodiment.

The expression of the vertical direction reward function $r_{vertical}$ is as follows:

$$r_{vertical} = r_{v1} + r_{v2}.$$

S74. judging whether the unmanned aerial vehicle meets landing conditions according to the observation values of the unmanned aerial vehicle and the landing platform and the reward function.

S75. controlling the unmanned aerial vehicle by a landing control agent according to the observation values of the unmanned aerial vehicle and the landing platform, the reward function, and whether the unmanned aerial vehicle meets the landing conditions until the unmanned aerial vehicle completes the dynamic landing.

Specifically, when the horizontal direction reward function $r_{level}$ and the vertical direction reward function $r_{vertical}$ converge, the unmanned aerial vehicle lands successfully. When the horizontal direction reward function $r_{level}$ and the vertical direction reward function $r_{vertical}$ are respectively stabilized at a constant value, it means that the horizontal direction reward function $r_{level}$ and the vertical direction reward function $r_{vertical}$ converge.

The present disclosure judges whether the current path optimization strategy of the unmanned aerial vehicle is based on the local path optimization algorithm or the frontier-perceived path optimization method by calculating the size of the perception threshold and the preset threshold. Different path planning methods could be selected for different conditions to avoid path redundancy or falling into a local optimal solution, thereby improving the path optimization efficiency. By designing the reward functions for the horizontal and vertical directions, the deep reinforcement learning algorithm is used to control the landing of the unmanned aerial vehicle, thereby increasing the update efficiency of the neural network, improving the problems of small sample space and slow data processing, and realizing accurate dynamic landing of the unmanned aerial vehicle;

In addition, by inserting the middle point during path optimization, it is possible to avoid the optimization trajectory from deviating too much to cause no solution to the optimization.

Figure 8:
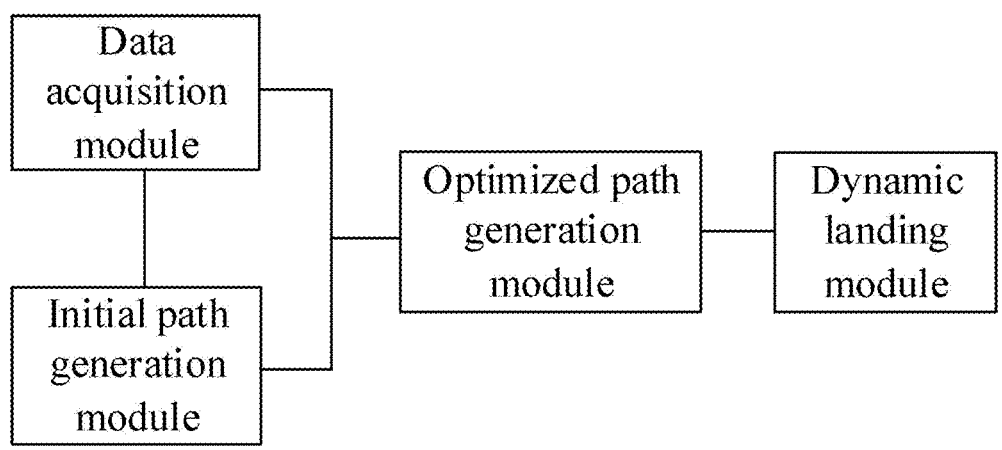
FIG. 8 is a schematic diagram illustrating the structure of an autonomous environment perception, path planning and dynamic landing system of an unmanned aerial vehicle according to an embodiment of the present disclosure.

FIG. 8 is a schematic diagram illustrating the structure of an autonomous environment perception, path planning and dynamic landing system of an unmanned aerial vehicle provided by an embodiment of the present disclosure. The system is configured to perform the above autonomous environment perception, path planning and dynamic landing method of the unmanned aerial vehicle in the embodiment. As shown in FIG. 8, the system includes the following modules:

a data acquisition module, configured to acquire depth information and two-dimensional plane information of an environment in real time by the unmanned aerial vehicle, and generate three-dimensional environmental information in space through a three-dimensional reconstruction algorithm based on the depth information and the two-dimensional plane information;

an initial path generation module, connected to the data acquisition module and configured to determine a global starting point and a global end point, and generate an initial path according to the global starting point and the global end point;

an optimized path generation module, connected with the data acquisition module and the initial path generation module, and configured to optimize the initial path in real time based on the local path optimization algorithm to obtain the first optimized path, and meanwhile, judge in real time whether the perception threshold of the current position of the unmanned aerial vehicle is greater than a preset threshold; if the perception threshold is greater than the preset threshold, perceive the frontier of the field of view of the unmanned aerial vehicle, store the perceived frontier in the form of space points and record as frontier points, and perform distance optimization on the frontier points to obtain a frontier space point set P; according to the frontier space point set P, optimize the initial path in real time based on a frontier-perceived path optimization method to obtain a second optimized path and a local end point; judge the distance between the current position of the unmanned aerial vehicle and the local end point in real time when the unmanned aerial vehicle advances along the second optimized path, and switch to optimizing the initial path in real time based on the local path optimization algorithm when the distance is less than the preset distance; otherwise, continue to optimize the initial path in real time based on the local path optimization algorithm until the global end point is reached; and a dynamic landing module, connected to the optimized path generation module and configured to carry out dynamic landing based on a deep reinforcement learning algorithm after the unmanned aerial vehicle arrives at the global end point.

It should be noted that the terms used in the present disclosure are only for describing specific embodiments, rather than limiting the scope of the present application. As shown in the description of the present disclosure, unless the context clearly indicates an exception, the words "one", "a", "a kind of" and/or "the" do not specifically refer to the singular, but may also include the plural. The terms "include", "contain" or any other variant thereof are intended to cover non-exclusive inclusion, so that the process, method or device including a series of elements includes not only those elements, but also includes other elements not explicitly listed, or also includes elements inherent to such process, method or device. In the absence of more restrictions, the elements defined by the sentence "include a . . . " do not exclude the presence of other identical elements in the process, method or device including the elements.

It should be noted that terms such as "central", "upper", "lower", "left", "right", "vertical", "horizontal", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. Unless otherwise specifically regulated and defined, terms such as "installation", "connected" and "connecting" shall be understood in broad sense, and for example, may refer to fixed connection or detachable connection or integral connection, may refer to mechanical connection or electrical connection, and may refer to direct connection or indirect connection through an intermediate medium or inner communication of two elements. For those ordinary skilled in the art, the specific meanings of the above terms in the present disclosure may be understood according to specific conditions.

Finally, it should be noted that the above embodiments are only used for describing the technical solution of the present disclosure rather than limiting the present disclosure. Although the present disclosure is described in detail by referring to the above embodiments, those ordinary skilled in the art should understand that: the technical solution recorded in each of the above embodiments can be still amended, or part or all of technical features therein can be replaced equivalently; and the amendments or replacements do not enable the essence of the corresponding technical solution to depart from the technical solutions of various embodiments of the present disclosure.

What is claimed is:

1. An autonomous environmental perception, path planning and dynamic landing method of an unmanned aerial vehicle, comprising the following steps:
   S1. obtaining depth information and two-dimensional plane information of an environment in real time by the unmanned aerial vehicle, and generating three-dimensional environmental information in space through a three-dimensional reconstruction algorithm based on the depth information and the two-dimensional plane information;
   S2. determining a global starting point and a global end point, and generating an initial path according to the global starting point and the global end point;
   S3. optimizing the initial path in real time based on a local path optimization algorithm to obtain a first optimized path, and judging in real time whether a perception threshold of the current position of the unmanned aerial vehicle is greater than a preset threshold; when the perception threshold is greater than the preset threshold, proceeding into S4; otherwise, continuing to perform S3, until the global end point is reached, and proceeding into S7;
   wherein a calculation formula of the perception threshold is as follows:

$$\tau_{per} = \frac{\Gamma_{optimized}}{\Gamma_{init}};$$

wherein $\tau_{per}$ represents the perception threshold, $\Gamma_{init}$ represents the initial path within the field of view of the unmanned aerial vehicle, $\Gamma_{optimized}$ represents the first optimized path within the field of view of the unmanned aerial vehicle, and t represents the preset threshold, when $\tau_{per} > \tau$, proceeding into S4;
   S4. perceiving the frontier of the field of view of the unmanned aerial vehicle, storing the perceived frontier in the form of space points and recording as frontier points, and performing distance optimization on the frontier points to obtain a frontier space point set P;
   S5. according to the frontier space point set P, optimizing the initial path in real time based on a frontier-perceived path optimization method to obtain a second optimized path and a local end point;
   S6. switching to optimizing the initial path in real time based on the local path optimization algorithm when the unmanned aerial vehicle advances along the second optimized path to the local end point; and S7. carrying out dynamic landing based on a deep reinforcement learning algorithm after the unmanned aerial vehicle arrives at the global end point;

wherein in S4, performing distance optimization on the frontier points to obtain a frontier space point set P comprises:

constructing a cube area with a side length of 2 m with the frontier point as a central point, dividing the cube area into 8 sub-cube areas with a side length of m, and taking vertices of the sub-cube areas as collision judgment points to judge whether the distance between each collision judgment point and a target obstacle is less than a preset collision distance; and if the distance between at least one collision judgment point and the target obstacle is less than the present collision distance, deleting the frontier point;

traversing all frontier points by repeating the above steps, and constructing the frontier space point set P according to the frontier points finally retained;

wherein in S5, according to the frontier space point set P, optimizing the initial path in real time based on a frontier-perceived path optimization method to obtain a second optimized path and a local end point comprises:

S51. determining the local end point;

according to the view distance of the unmanned aerial vehicle, selecting the point on the initial path that is farthest from the current position of the unmanned aerial vehicle as the initial local end point; and if the initial local end point is within the obstacle range, selecting the second local end point by doubling the view distance of the unmanned aerial vehicle based on the initial local end point until the selected local end point is outside the obstacle range;

S52. determining decision indicators, and calculating a decision function according to the decision indicators; wherein the decision indicators comprise: adjacent point constraint, distance constraint, and direction constraint;

$$d_A(p_i) = \|p_c - p_i\|;$$
$$f_A(i) = \begin{cases} (d_A(p_i) - d_{min})/(d_{max} - d_{min}) & d_{min} < d(i) < d_{max} \\ 1 & \text{others} \end{cases};$$

wherein $d_A$ represents the distance between adjacent points, $f_A$ represents a cost function of the adjacent points, $p_i$ represents the i-th frontier point in the frontier space point set P, $p_c$ represents the current position of the unmanned aerial vehicle, $\|\cdot\|$ represents the Euclidean distance operation, $d_{min}$ represents the minimum value of the selected point range within the field of view of the unmanned aerial vehicle, and $d_{max}$ represents the maximum value of the selected point range within the field of view of the unmanned aerial vehicle;

$$d_L(p_i) = \|p_g - p_i\|;$$
$$f_L(i) = d_L(p_i)/(d_{Lmax} - d_{Lmin});$$

wherein $d_L$ represents the distance between the current position $p_c$ of the unmanned aerial vehicle and the local end point $p_g$, $f_L$ represents a distance cost function, $p_g$ represents the local end point, $d_{Lmin}$ represents the minimum value of the distance from all frontier points in the frontier space point set P to the local end point $p_g$, and $d_{Lmax}$ represents the maximum value of the distance from all frontier points in the frontier space point set P to the local end point $p_g$;

the expressions of the direction constraint are as follows:

$$d_D(p_i) = \frac{p_i - p_c}{\|p_i - p_c\|} \cdot \frac{v_c}{\|v_c\|} + 1;$$
$$f_D(i) = (d_D(p_i) - d_{Dmin})/(d_{Dmax} - d_{Dmin});$$

wherein $d_D$ represents a specific value of the deviation from a current speed direction, $f_D$ represents a direction cost function, $v_c$ represents a current speed of the unmanned aerial vehicle, $d_{Dmin}$ represents the minimum value of the deviation from the current speed direction, and $d_{Dmax}$ represents the maximum value of the deviation from the current speed direction;

the calculation formula of the decision function is as follows:

$$p_b = \underset{p_i \in P}{\operatorname{argmin}} \, \lambda_A f_A(p_i) + \lambda_L f_L(p_i) + \lambda_D f_D(p_i);$$

wherein $\lambda_A$, $\lambda_L$ and $\lambda_D$ represent the weight of the adjacent point constraint, the weight of the distance constraint, and the weight of the direction constraint respectively, and pb represents an optimal replanning point;

S53. generating the second optimized path according to the current position $p_c$ of the unmanned aerial vehicle and the optimal replanning point $p_b$.

2. The autonomous environmental perception, path planning and dynamic landing method according to claim 1, wherein in S6, switching to optimizing the initial path in real time based on the local path optimization algorithm when the unmanned aerial vehicle advances along the second optimized path to the local end point comprises:

S61. when the unmanned aerial vehicle advances along the second optimized path, each time a preset time threshold or a preset distance threshold is passed, reperforming S5 and updating the optimal replanning point pb and the second optimized path;

S62. recording a path length $L_{thresh}$ that the unmanned aerial vehicle flies along the second optimized path from the current position, and when the path length $L_{thresh}$ is greater than a preset path length, reselecting the local end point $p_g$, reperforming S5 according to the new local end point, and updating the optimal replanning point $p_b$ and the second optimized path;

wherein the local end point $p_g$ is reselected, specifically as follows:

a new local end point is selected by doubling the view distance of the unmanned aerial vehicle based on the current local end point;

S63. switching to optimizing the initial path in real time based on the local path optimization algorithm when the unmanned aerial vehicle arrives at the local end point $p_g$.

3. The autonomous environmental perception, path planning and dynamic landing method according to claim 2, wherein optimizing the initial path in real time based on the local path optimization algorithm to obtain the first optimized path, or optimizing the initial path in real time based on the frontier-perceived path optimization method to obtain the second optimized path further comprises:

inserting a middle point according to the current position of the unmanned aerial vehicle and the local end point, and generating the first optimized path or the second optimized path;

the calculation formula of the middle point is as follows:

$$p_m = \frac{p_c + p_g}{2} + \frac{v_c^3}{2 \cdot a_{max} \cdot \left\| v_c \cdot \frac{v_c \times (p_g - p_c)}{\|v_c\| \cdot \|p_g - p_c\|} \right\|} \left( \frac{v_c \times (p_g - p_c)}{\|v_c\| \cdot \|p_g - p_c\|} \right)^3;$$

wherein $p_m$ represents the middle point, and $a_{max}$ represents the maximum angular velocity of the unmanned aerial vehicle.

4. The autonomous environmental perception, path planning and dynamic landing method according to claim 1, wherein in S7, carrying out dynamic landing based on a deep reinforcement learning algorithm after the unmanned aerial vehicle arrives at the global end point comprises:

S71. constructing a landing control agent based on a deep deterministic policy gradient algorithm;

S72. obtaining observation values of the unmanned aerial vehicle and the landing platform;

S73. defining a reward function; wherein the reward function comprises a horizontal direction reward function and a vertical direction reward function;

S74. judging whether the unmanned aerial vehicle meets landing conditions according to the observation values of the unmanned aerial vehicle and the landing platform and the reward function;

S75. controlling the unmanned aerial vehicle by a landing control agent according to the observation values of the unmanned aerial vehicle and the landing platform, the reward function, and whether the unmanned aerial vehicle meets the landing conditions until the unmanned aerial vehicle completes the dynamic landing.

* * * * *